Figure 1:
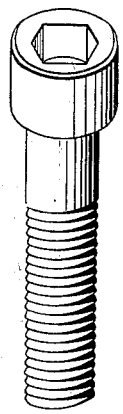

Jan. 21, 1941.   H. T. HALLOWELL, JR   2,229,565
SOCKETED METALLIC ARTICLE
Filed Sept. 17, 1938

Inventor:-
Howard Thomas Hallowell Jr.
By his Attorneys
Howson & Howson

Patented Jan. 21, 1941

2,229,565

UNITED STATES PATENT OFFICE 2,229,565

SOCKETED METALLIC ARTICLE

Howard Thomas Hallowell, Jr., Jenkintown, Pa., assignor to Standard Pressed Steel Co., Jenkintown, Pa., a corporation of Pennsylvania Application September 17, 1938, Serial No. 230,497

5 Claims. (Cl. 85—9)

This invention relates primarily to improvements in socket head cap screws and a principle object of the invention is to provide a screw of this class having throughout better characteristics of strength, toughness and durability than are obtainable by the prior conventional manufacturing processes.

Another object of the invention is to provide a novel method of manufacture by which the aforesaid improved results are obtainable.

The invention, as will hereinafter appear, has application to the manufacture of other socketed articles of manufacture, such for example as hollow set screws, socket wrenches and the like, and is therefore not limited solely to cap screws.

A socket type cap screw should have a comparatively soft, tough and ductile body to allow for a maximum amount of stretch before failure of the body, and to provide resistance to sudden shock. The area of juncture of the head and body should also be kept soft and ductile to minimize the effect of concentrated stresses brought about by heat treating this non-uniform section. It is quite possible to produce the above requirements by taking a screw made of a suitable alloy steel, heating it and quenching it, and then tempering it at a heat which will bring about the required physical strength and toughness. A tempering heat of 700° F., for example, will produce in a steel of the class conventionally used for screws of this type a 32 to 35 C Rockwell hardness, comparatively soft yet having a tensile strength of 150,000 lbs. per sq. in. and a high degree of toughness and ductility.

In a screw of this type, the wall of the socket is subjected to great stress and to a severe reaming effect by the wrench when tightening or loosening. This part of the screw, therefore, should be relatively hard to provide for a maximum amount of wear in service. The best sockets are a critical balance of extreme hardness tempered just sufficiently to prevent cracking. Socket hardness has an immediate bearing on the depth of the socket. A soft socket must be deeper than a hard socket to exhibit the same wearing properties. The socket depth in turn has a direct relationship to the strength of the screw, since too deep a socket will not allow sufficient section of metal at the bottom of the head to resist shock, and the head will then have a tendency to part from the body at the juncture. This relation of socket depth to metal section under the socket is critical and calls for extreme accuracy in manufacture. Irrespective of this factor, a hard socket is desirable for the reason that in the normal course of events the sockets tend to become all, or partially filled with dirt or foreign matter, which when the wrench is inserted does not allow it to extend to the bottom of the socket and thereby decreases the amount of effective contact area between the wrench and the walls of the socket. Even though the socket is extremely deep it becomes, if soft, relatively worthless when partially filled with dirt.

To make the socket hard under prior manufacturing methods, the entire screw must be made hard. If, for example, the same steel as before is used, the screw must be heated, quenched and tempered at say 400° F. and the entire screw will then be relatively hard, say in the neighborhood of 40 to 44 C Rockwell. At this hardness the socket is excellent but the body has practically no ductility, and the juncture section between the head and the body is too highly stressed to have safe load-carrying characteristics. On the other hand, as pointed out above, when the socket is soft, say 32 to 35 C Rockwell hardness, it is practically worthless although the body and head joint conditions are ideal.

At present, manufacturers of these screws attempt to strike a compromise between the two extremes, and the resulting screw accordingly is neither sufficiently soft in the body and in the juncture between the body and the head to be safe, nor hard enough to be serviceable in the socket. Obviously, the ideal screw of the socket type is one combining both properties, i. e., a relatively soft body and head-body juncture, and a relatively hard socket having pronounced wearing properties. A specific object of the present invention is to provide a socket type screw having the aforesaid desirable characteristics, and to provide a method of processing screws of this type whereby it will be economically possible to have in the threaded body and in the immediate adjoining portion of the head, one predetermined degree of hardness and the physical properties of ductility, elasticity and shock resistance, while at the same time having in the area of the socket an entirely different degree of hardness and the physical properties of extreme hardness and wear resistance.

In proceeding in accordance with the invention the screw to be processed, composed of a suitable alloy steel, may be heated and quenched and tempered by conventional commercial heat treating methods to produce a body of great toughness, ductility and shock resistance. The screw, for example, might be tempered at 700° F. to produce a hardness of 30 to 35 C Rockwell. A selected section of the head, embracing all or a portion of the socket area is then locally heated in a manner to insure confinement of the heat to the selected section to the exclusion of the adjoining portions of the head. This may be accomplished, for example, by introducing the head of the screw into an induction loop of non-magnetic material which, by reason of the presence within the loop of the magnetic steel, concentrates induced currents of high frequency in the immediately adjoining portion of the head. The selected section of the head within the loop may be thus heated to a desired temperature so rapidly and accurately that the heat has no opportunity to spread to the adjoining portion or portions of the metal. When this local area has been heated to a desired quenching temperature, the entire screw is immediately immersed in a bath of quenching liquid whereby the heated portion becomes extremely hard while the other portions of the screw remain unaffected. The entire screw is now retempered by conventional process at a temperature lower, say for example at 300° F., than the first tempering heat so that only the section of the head that was locally heated as previously described is affected. By this method any desired predetermined part of the head section of the screw may be given great wear-resisting hardness, from 48 to 50 C Rockwell, for example, without in any way affecting the ductility and shock resisting characteristics of the threaded body or the head-body juncture.

By the aforedescribed process, it is apparent that a screw can be produced that is, within the recognized limitations of the available materials, theoretically perfect, such a screw having the correct degree or degrees of hardness and wearability in the wall of the socket and an equally correct degree or degrees of toughness and durability in the other parts. I have found, however, that best results are obtained by confining the relatively hard section to a limited axial area only of the socket and, preferably, to the area at the outer end or top of the head. Thus, only the portion of the wall adjoining and embracing the mouth of the socket are made to exhibit the extra hardness, and the portion of the wall at the bottom of the socket will exhibit the relatively soft, ductile and tough properties of the remaining portions of the screw. In this manner the relatively hard and brittle part of the socket is in effect reinforced by the relatively soft and tough part. One advantage of this arrangement resides in the fact that the relatively hard wear resisting portion of the socket, by reason of the reinforcing effect of the adjoining relatively soft and tough portion, can be made materially harder without danger of splitting under strain than is practical if the entire socket area is hardened.

Obviously the hardened portion may be confined to an area intermediate the outer and inner ends of the socket leaving the wall of the socket relatively soft and tough at both sides of the hardened section. Similarly, by suitable manipulation of the electric heating means described above the adjoining relatively hard and soft areas may be made to merge gradually one into the other. Similarly, the hardened area may be made to embrace the entire side wall of the socket; and may, if desired, be extended to embrace also the immediately adjoining unsocketed portion of the head, exclusive, however, of the head-body juncture.

Figure 7:
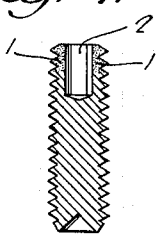
Figure 8:
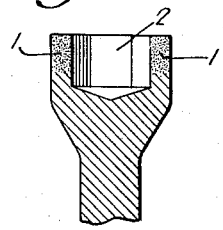

The foregoing will be more readily understood by reference to the attached drawing, wherein Figure 1 is a view in perspective of a screw of the type to which the invention relates;

Figs. 2 to 6, inclusive, are respectively longitudinal sectional views of screws showing the relatively hard and soft areas in various arrangements;

Fig. 7 is a longitudinal sectional view of a hollow set screw made in accordance with the invention, and Fig. 8 is a fragmentary sectional view illustrating an application of the invention to a socket wrench.

Figure 2:
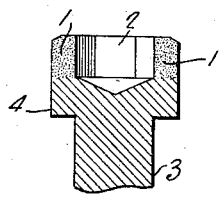

In the various sectional views of the drawing, the relatively hard sections are indicated by stippling, and are thereby distinguished from the softer and tougher sections. In Fig. 2, the relatively hard section 1 embraces the entire side wall of the socket 2, and the remainder of the screw, including the body 3 and the inner or lower portion 4 of the head which adjoins the body, exhibits the properties of relative softness and toughness.

Figure 3:
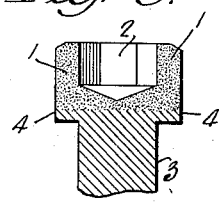

In Fig. 3, the harder section 1 embraces not only the entire side wall of the socket, but extends to the immediately adjoining unsocketed portion of the head. It is to be noted, however, that the relatively hard section stops short of the head and body juncture.

Figure 4:
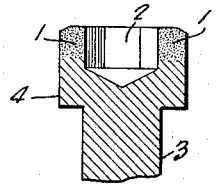

In Fig. 4, the harder section 1 embraces only an axial part of the socket wall extending from the outer end or mouth of the socket, leaving the remainder of the screw inclusive of the inner or lower portion of the socket wall of the softer and tougher metal.

Figure 5:
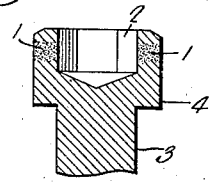
Figure 6:
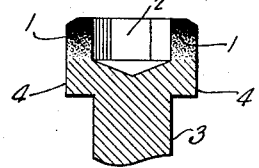

In Fig. 5, the relatively hard section 1 is confined to a portion only of the wall of the socket intermediate the outer and inner ends of the socket; while in Fig. 6, the extreme outer end of the head at the mouth of the socket is relatively hard and the socket wall becomes progressively softer and tougher as the bottom of the socket is approached. Each of the arrangements illustrated in Figs. 4, 5 and 6, as previously set forth, permits of a degree of hardness in the metal considerably in excess of the permissible hardness in the embodiment of the invention shown in Fig. 2.

Figs. 7 and 8, also as previously set forth, illustrate the invention in its application to other socket articles of manufacture.

I claim:

1. As a new article of manufacture, an article of the character described, consisting of an elongated integral body of ferrous metal substantially symmetrical with respect to the longitudinal axis, and having in one end an axially extending working socket, the said body of metal substantially throughout being relatively soft and tough and exhibiting at the socketed end thereof a relatively hard section forming a part only of the wall of said socket.

2. As a new article of manufacture, a screw threaded element composed of an integral body of ferrous metal, and having in one end an axially extending wrench socket, the metallic body of said screw substantially throughout being relatively soft and tough and exhibiting at the socketed end thereof a relatively hard section forming a part only of the wall of said socket.

3. A socketed cap screw composed integrally of ferrous metal, the metallic body of said screw and the adjoining portion of the head being relatively soft and tough, and said head terminating at its outer end in a relatively hard section forming a part only of the wall of said socket.

4. A socketed cap screw composed integrally of ferrous metal, the metallic body of said screw and the adjoining portion of the head being relatively soft and tough, and said head having intermediate the inner and outer ends thereof a relatively hard section forming a part only of the wall of said socket.

5. As a new article of manufacture, an article of the character described, consisting of an elongated integral body of ferrous metal substantially symmetrical with respect to the longitudinal axis, and having in one end an axially extending working socket, the metallic wall of said socket being in part relatively soft and tough and in the remaining part being relatively hard and wear resisting.

HOWARD THOMAS HALLOWELL, JR.